US010592807B2

(12) United States Patent
Brewer et al.

(10) Patent No.: US 10,592,807 B2
(45) Date of Patent: Mar. 17, 2020

(54) SYSTEMS AND METHODS FOR RECOMMENDING CONTENT ITEMS

(71) Applicant: Facebook, Inc., Menlo Park, CA (US)

(72) Inventors: Jason Eric Brewer, Kirkland, WA (US); Bradley Ray Green, Snohomish, WA (US)

(73) Assignee: Facebook, Inc., Menlo Park, CA (US)

( * ) Notice: Subject to any disclaimer, the term of this patent is extended or adjusted under 35 U.S.C. 154(b) by 574 days.

(21) Appl. No.: 15/254,921

(22) Filed: Sep. 1, 2016

(65) Prior Publication Data

US 2018/0060736 A1 Mar. 1, 2018

(51) Int. Cl.
*G06N 5/02* (2006.01)
*G06N 3/04* (2006.01)

(52) U.S. Cl.
CPC ........... *G06N 5/022* (2013.01); *G06N 3/0445* (2013.01)

(58) Field of Classification Search
CPC .... G06N 99/005; G06N 5/022; G06N 3/0445; G06N 20/00; G06F 17/30867; G06Q 50/01
See application file for complete search history.

(56) References Cited

U.S. PATENT DOCUMENTS

| 8,935,245 B1* | 1/2015 | Cionca | G06F 17/30554 |
| | | | 707/732 |
| 9,818,145 B1* | 11/2017 | Finkelstein | G06Q 30/0631 |
| 2009/0177651 A1* | 7/2009 | Takamatsu | G06F 17/30867 |
| 2011/0043625 A1* | 2/2011 | Cobb | G06K 9/00771 |
| | | | 348/143 |
| 2011/0055699 A1* | 3/2011 | Li | G06F 17/30864 |
| | | | 715/709 |
| 2012/0254188 A1* | 10/2012 | Koperski | G06F 17/30663 |
| | | | 707/740 |
| 2014/0201126 A1* | 7/2014 | Zadeh | G06K 9/627 |
| | | | 706/52 |
| 2015/0213361 A1* | 7/2015 | Gamon | G06N 20/00 |
| | | | 706/12 |

(Continued)

OTHER PUBLICATIONS

Rudolph Mayer, Robert Neumayer, and Andreas Rauber, "Rhyme and Style Features for Musical Genre Classification by Song Lyrics", 2008, ISMIR 2008—Session 3a—Content-Based Retrieval, Categorization and Similarity 1, pp. 337-342. (Year: 2008).*

(Continued)

*Primary Examiner* — Eric Nilsson
(74) *Attorney, Agent, or Firm* — Sheppard Mullin Richter & Hampton LLP

(57) ABSTRACT

Systems, methods, and non-transitory computer-readable media can determine a respective latent representation for each entity in a set of entities that are accessible through the social networking system, wherein a latent representation for an entity is determined based at least in part on a topic model associated with the entity, each latent representation for an entity having a lower dimensionality than a topic model of the entity. One or more candidate entities that are related to a first entity can be determined based at least in part on the respective latent representations for the candidate entities and the first entity. At least a first candidate entity from the one or more candidate entities can be provided as a recommendation to a user that formed a connection with the first entity.

17 Claims, 7 Drawing Sheets

(56) References Cited

U.S. PATENT DOCUMENTS

2015/0294377 A1\* 10/2015 Chow ................ G06Q 30/0263
                                                      705/347
2015/0347438 A1   12/2015 Arini et al.
2017/0091617 A1\*  3/2017 Baughman ........... G06N 3/0472
2017/0109444 A1\*  4/2017 Modarresi ......... G06F 17/30867

OTHER PUBLICATIONS

Wang, Chong, and David M. Blei. "Collaborative topic modeling for recommending scientific articles." Proceedings of the 17th ACM SIGKDD international conference on Knowledge discovery and data mining. ACM, 2011. (Year: 2011).\*

Wan, Li, Leo Zhu, and Rob Fergus. "A hybrid neural network-latent topic model." Artificial Intelligence and Statistics. 2012. (Year: 2012).\*

Wang, Yaoli, et al. "Linked activity spaces: Embedding social networks in urban space." Computational approaches for urban environments. Springer, Cham, 2015. 313-336. (Year: 2015).\*

\* cited by examiner

SYSTEMS AND METHODS FOR RECOMMENDING CONTENT ITEMS

FIELD OF THE INVENTION

The present technology relates to the field of content provision. More particularly, the present technology relates to techniques for recommending content items.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that would also be of interest to the user. Providing such additional content items can enhance the user experience and may help realize the full potential of the social network. Unfortunately, attempts to provide such additional content items and to maintain a high level of interest from the user often fail. The growing size of social networks can also pose problems with respect to the goal of providing content items of high interest to the user. As available content grows in amount, in theory, the likelihood of finding more content items of high interest to the user should increase. However, in practice, the ability to identify content items of high interest to the user can be complicated by the sheer volume of content.

SUMMARY

Various embodiments of the present disclosure can include systems, methods, and non-transitory computer readable media configured to determine a respective latent representation for each entity in a set of entities that are accessible through the social networking system, wherein a latent representation for an entity is determined based at least in part on a topic model associated with the entity, each latent representation for an entity having a lower dimensionality than a topic model of the entity. One or more candidate entities that are related to a first entity can be determined based at least in part on the respective latent representations for the candidate entities and the first entity. At least a first candidate entity from the one or more candidate entities can be provided as a recommendation to a user that formed a connection with the first entity.

In an embodiment, the systems, methods, and non-transitory computer readable media are configured to obtain a respective topic model for each entity in the set of entities and train at least one model using the topic models to output a respective latent representation that corresponds to a topic model.

In an embodiment, at least one model is implemented as a restricted Boltzmann machine.

In an embodiment, the model includes at least a set of input nodes and a set of hidden nodes, each input node corresponding to a topic and being configured to receive a value indicating whether the topic was identified in an entity, and each hidden node being configured to output a value determined based at least in part on values provided to one or more of the input nodes.

In an embodiment, the systems, methods, and non-transitory computer readable media are configured to determine that a distance between a respective latent representation for the candidate entity and a latent representation for the first entity satisfies a threshold distance.

In an embodiment, the systems, methods, and non-transitory computer readable media are configured to determine that at least one geographic centroid associated with the first candidate entity has a threshold amount of overlap with at least one geographic centroid associated with the first entity.

In an embodiment, the systems, methods, and non-transitory computer readable media are configured to determine that a reconstruction score for the first candidate entity satisfies a threshold score, the reconstruction score being determined using a model trained to output a latent representation for the first candidate entity, wherein the reconstruction score measures an accuracy of a reconstruction of a topic model of the first candidate entity through the model using the latent representation.

In an embodiment, the systems, methods, and non-transitory computer readable media are configured to determine that a difference between a number of fans associated with the first candidate entity and a number of fans associated with the first entity satisfies a threshold value.

In an embodiment, the systems, methods, and non-transitory computer readable media are configured to determine that at least a threshold number of users have fanned both the first candidate and the first entity.

In an embodiment, an entity corresponds to at least a page, user profile, group, story, or status update that is accessible through the social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
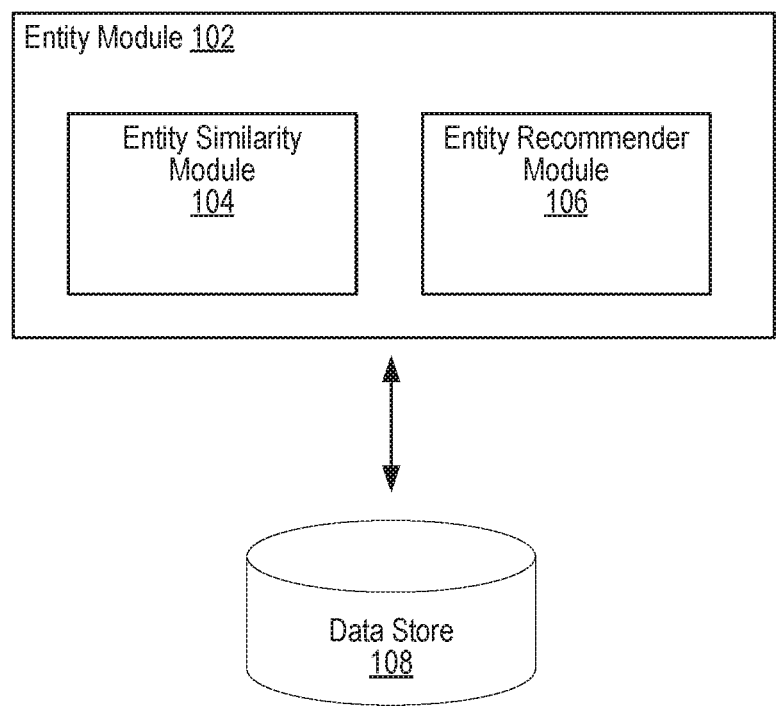
FIG. 1 illustrates an example system including an example entity module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Recommending Content Items

Today, people often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social networking system for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that would also be of interest to the user. Providing such additional content items can enhance the user experience and may help realize the full potential of the social network. Unfortunately, attempts to provide such additional content items and to maintain a high level of interest from the user often fail. The growing size of social networks can also pose problems with respect to the goal of providing content items of high interest to the user. As available content grows in amount, in theory, the likelihood of finding more content items of high interest to the user should increase. However, in practice, the ability to identify content items of high interest to the user can be complicated by the sheer volume of content. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, entity recommendations can be generated for users in a social networking system. In general, entities can include pages, user profiles, groups, stories, and status updates, to name some examples. A user can interact with an entity in various ways and such interactions can result in the user forming a connection with the entity. For example, an entity may be a page that is accessible through the social networking system. The page may correspond to some type of subject matter (e.g., a business, topic, location, user, etc.). Users of the social networking system can navigate to the page to learn more about the subject matter as well as access and/or post content through the page. Users have the option form a connection, or be associated, with the page, for example, by "liking" the page (e.g., selecting a "like" option through the social networking system) or by becoming a "fan" the page (e.g., selecting a "fanning" option through the social networking system). In this example, a user can form a connection with the page by performing actions such as visiting the page, fanning the page, and/or posting through the page, for example. Other types of interactions through which entity connections can be formed include accessing (or visiting) a user profile, posting to a user profile, friending a user, joining a group, associating with cities, reading stories (e.g., stories presented in a user's news feed), and/or liking a status update. Naturally, this list of interactions is not exhaustive and, depending on the implementation, there may be many other types of interactions through which connections between users and entities may be formed. In some embodiments, a connection between a user and an entity is considered a conversion.

In various embodiments, entity recommendations can be determined based, in part, on latent representations (e.g., encodings) of entities. Such latent representations can be determined using a trained model that can be implemented, for example, as a restricted Boltzmann machine (RBM). In general, each latent representation corresponds to an entity and is determined, in part, on the topics that are associated with the entity. In some embodiments, the respective distances between such latent representations can be determined and used to cluster entities that are closely related to one another. As a result, entities that are related to one another can easily be identified and be recommended to users of the social networking system.

FIG. 1 illustrates an example system including an example entity module 102, according to an embodiment of the present disclosure. As shown in the example of FIG. 1, the entity module 102 can include an entity similarity module 104 and an entity recommender module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the entity module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the entity module 102 can be implemented, in part or in whole, as software running on one or more computing devices or systems, such as on a user or client computing device. In one example, the entity module 102 or at least a portion thereof can be implemented as or within an application (e.g., app), a program, or an applet, etc., running on a user computing device or a client computing system, such as the user device 610 of FIG. 6. In another example, the entity module 102 or at least a portion thereof can be implemented using one or more computing devices or systems that include one or more servers, such as network servers or cloud servers. In some instances, the entity module 102 can, in part or in whole, be implemented within or configured to operate in conjunction with a social networking system (or service), such as the social networking system 630 of FIG. 6.

The entity module 102 can be configured to communicate and/or operate with the at least one data store 108, as shown in the example system 100. The at least one data store 108 can be configured to store and maintain various types of data including, for example, latent representations that are generated for entities as described herein. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data.

In various embodiments, the entity similarity module 104 is configured to train a model for determining latent representations of entities and using such latent representations for identifying entities that are similar to one another. More details regarding the entity similarity module 104 will be provided below with reference to FIG. 2. The entity recommender module 106 can be configured to provide entity recommendations for users. More details regarding the entity recommender module 106 will be provided below with reference to FIG. 3.

Figure 2:
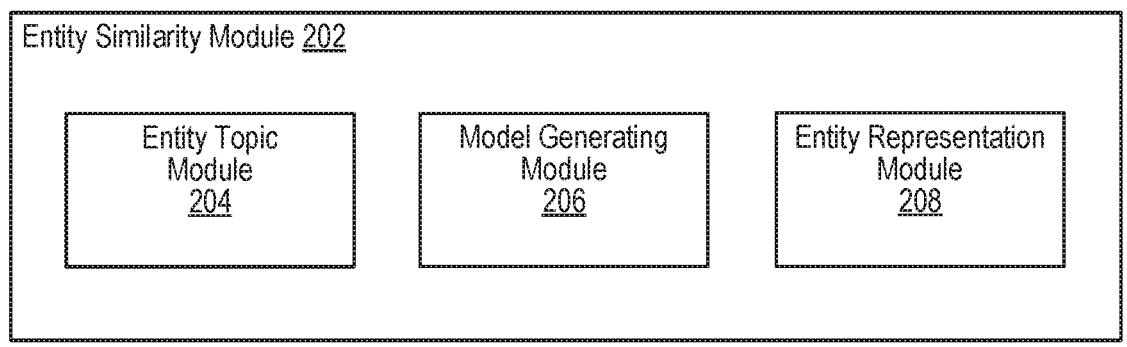
FIG. 2 illustrates an example of an entity similarity module configured to identify similar entities, according to an embodiment of the present disclosure.

FIG. 2 illustrates an example of an entity similarity module 202 configured to identify similar entities, according to an embodiment of the present disclosure. In some embodiments, the entity similarity module 104 of FIG. 1 can be implemented as the entity similarity module 202. As shown in FIG. 2, the entity similarity module 202 can include an entity topic module 204, a model generating module 206, and an entity representation module 208.

As mentioned, the entity similarity module 202 can be configured to train a model for determining latent representations of entities and using such latent representations for identifying entities that are similar to one another. In some embodiments, a latent representation comprises a set of binary values that are generated, in part, from a topic model of an entity. In various embodiments, the entity topic module 204 is configured to obtain a respective set of topics, or topic model, for each entity. The topic model for an entity identifies, from a set of topics, one or more topics that were determined to correspond to the entity. Such topics are generally determined based on various content associated with the entity. For example, the topics may be determined from a page title, a page description, content items posted in a page, text from posts in a page, metadata and/or text inferred from content items (e.g., images, videos, audio, etc.) included in a page, comments posted by users in a page, text used when sharing the page and/or content items in the page, to name some examples. In one example, a topic model for a page about a coffee shop "XYZ Roasters" can indicate that the topics "XYZ Roasters", "coffee shop", "coffee", "café", and "pastries" were identified for the page. In some embodiments, a topic model for an entity is represented as a data structure (e.g., array, vector, etc.) in which each element corresponds to a particular topic. In such embodiments, elements corresponding to topics that were identified for the entity are each assigned a value of 1 while elements corresponding to topics that were not identified (or topics that could not be identified with a threshold level of certainty) for the entity are each assigned a value of 0. For example, assuming a topic model includes elements that each correspond to a topic in a set of possible topics "coffee shop", "bar", "fast food", "hot coffee", and "pastries". In this example, the topic model for a page "XYZ Coffee Shop" that is associated with the topics "coffee shop", "hot coffee", and "pastries" may be represented as [1, 0, 0, 1, 1]. Given that there may be millions of different topics that are evaluated for each entity, the topic model for an entity can be very large. Thus, in some embodiments, respective latent representations for each entity's topic model are determined using a trained model. In various embodiments, such latent representations reduce the dimensionality of topic models, thereby providing a compact, yet meaningful, representation of the topic models.

The model generating module 206 is configured to train a model for generating latent representations. In some embodiments, the model is a single layer recurrent neural network that is implemented, for example, as a restricted Boltzmann machine (RBM). The model can be trained to receive an entity's topic model as input and to produce a respective latent representation for the topic model as output. Thus, the model can operate as an auto-encoder that produces a latent representation for each entity. In various embodiments, the model includes a set of visible input nodes and each input node corresponds to a particular topic. Since the model is sparse, a value does not need to be provided to every input node. That is, the default state for a given input node to the model is treated as "missing." As a result, if the correct value for an input node to the model is uncertain, the values of the model's intermediate layer are unaffected and the predicted value from the model is ignored for purposes of training. In some embodiments, the model is structured so that the layers of the network are binary-valued. For example, each of the input nodes of the network correspond to a particular topic. Further, each input node is configured to receive either a 1 or 0 as input, which signifies whether the topic corresponding to the node was or was not identified, respectively, for a given entity. This configuration allows the model to receive the respective topic models for entities as input. Thus, instead of one floating point value for each hidden node of the network, the information transferred is limited to a single bit: 0 or 1. The 0 or 1 is chosen by taking the floating point calculation as a probability of activating the hidden node. In some embodiments, rather than using topics as input, the model can be configured to receive n-grams, which can be determined from content in entities, to be used as inputs to the model. Such n-grams can help differentiate language peculiarities (e.g., long vs. short words, misspellings, actual language, etc.). In some embodiments, the model can be implemented using a deep Boltzmann machine (DBM), or stacked auto-encoders, to derive higher level features which can produce more optimal latent representations.

The model itself is trained using contrastive divergence. In various embodiments, the training involves inputting various topic models as training examples to the model. As mentioned, a topic model for an entity can be represented as a data structure, or a set of elements, in which each element corresponds to a particular topic and has a corresponding value of 0 or 1. When inputting a topic model, the input node of the model that corresponds to a given topic is provided a value that was assigned to an element in the topic model that also corresponds to that topic. For example, assuming a topic model includes five elements that each correspond to a topic in a set of possible topics "coffee shop", "bar", "fast food", "hot coffee", and "pastries". In this example, the topic model for a page "XYZ Coffee Shop" that is associated with the topics "coffee shop", "hot coffee", and "pastries" may be represented as [1, 0, 0, 1, 1]. When inputting this topic model to input nodes, the value 1 would be provided to an input node that corresponds to the topic "coffee shop", the value 0 would be provided to an input node that corresponds to the topic "bar", the value 0 would be provided to an input node that corresponds to the topic "fast food", the value 1 would be provided to an input node that corresponds to the topic "hot coffee", and the value 1 would be provided to an input node that corresponds to the topic "pastries".

During training, the input value for each input node is multiplied by a respective weight between the input node and each hidden node to produce a value v for each of the hidden nodes. The value v for each hidden node is collapsed into a probability p[h] using a logistic function to get a probability of activation for that hidden node. A 0 or 1 is determined for each hidden node based on their respective probabilities p[h]. During reconstruction, this process is run through the model in reverse to determine which of the original input nodes are activated. In various embodiments, this training process is repeated one or more times and increases as training progresses. In some embodiments, the weights for each of the hidden nodes can be altered as follows:

$$c=\lambda*(i*n_h-r*r_h),$$

where c is the change in weight, $\lambda$ is the learning rate, i is the initial input value, $n_h$ corresponds to the activated hidden nodes, r is the reconstruction value, and $r_h$ corresponds to the hidden nodes activated during reconstruction.

In some instances, the model generating module 206 can employ one or more techniques to improve the rate at which the training converges. In some embodiments, the model generating module 206 can apply a momentum-based approach for changing weights. For example, if a weight was last updated in the same direction as the current update (e.g., the weight was previously decreased and is also decreasing in the current update or the weight was previously increased and is also increasing in the current update), then larger changes to the weight are made, for example, based on a predefined amount. In contrast, if the weight was last updated in a different direction as the current update (e.g., the weight was previously decreased but now increasing or the weight was previously increased but now decreasing), then smaller changes to the weight are made, for example, based on a predefined amount. In some embodiments, the model generating module 206 applies regularization to improve training convergence. For example, to apply regularization, the model generating module 206 can trend the weights toward zero by multiplying each weight by some factor f (where f<1) each time the weight is updated. In some embodiments, the model generating module 206 improves training convergence by biasing nodes. For example, input nodes and hidden nodes that correspond to topics determined to be popular, e.g., topics that were identified for at least a threshold number of entities, can be made more likely to activate whereas input nodes and hidden nodes that correspond to topics determined to be rare, e.g., topics that were identified for less than a threshold number of entities, can be made less likely to activate.

The entity representation module 208 can generate respective latent representations, or encodings, for entities, for example, by inputting a respective topic model for an entity to the trained model, which then outputs a corresponding latent representation for the entity. As mentioned, a latent representation can comprise a set of binary values that are generated, in part, from a topic model of an entity. Such latent representations have a lower dimensionality than their corresponding topic models. These latent representations can be used to identify entities that are similar to one another, as described below.

Figure 3:
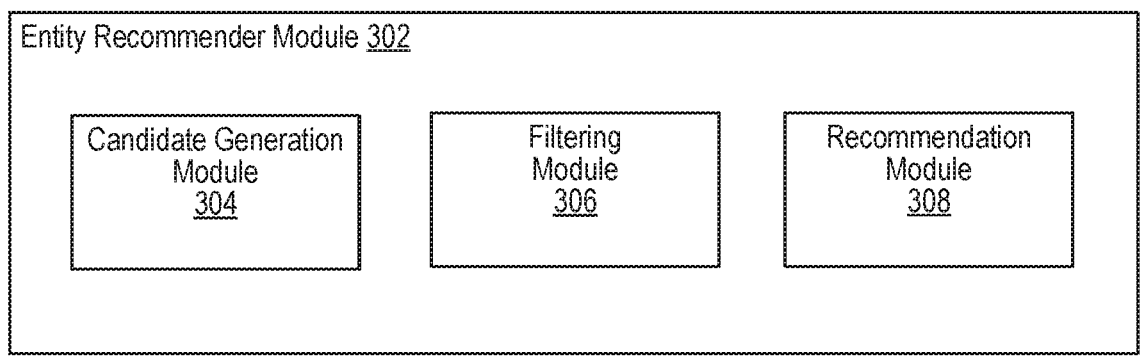
FIG. 3 illustrates an example of an entity recommender module configured to recommend entities, according to an embodiment of the present disclosure.

FIG. 3 illustrates an example of an entity recommender module 302 configured to identify similar entities, according to an embodiment of the present disclosure. In some embodiments, the entity recommender module 106 of FIG. 1 can be implemented as the entity recommender module 302. As shown in FIG. 3, the entity recommender module 302 can include a candidate generation module 304, a filtering module 306, and a recommendation module 308.

The candidate generation module 304 is configured to determine a set of entities that are similar for each entity. Similar entities can be determined based on their respective latent representations, for example, using the k-nearest neighbors algorithm. In various embodiments, the distance between entities is measured based on the cosine similarity between the respective latent representations of the two entities. Thus, for any given entity i, the number of nearest neighbor entities is determined by a threshold distance $\Theta_i$ between the entity i and the neighbor entity. For example, the list of neighbor entities for entity i includes all entities j for which the respective cosine similarity between the latent representation for entity i ($v_i$) and the latent representation for entity j ($v_j$) is greater than the threshold distance $\Theta_i$ (e.g., $\cos(v_i, v_j) > \Theta_i$). Using latent representations for such clustering provides a number of advantages. For example, since latent representations are more compact than topic models, the process for identifying similar entities is generally faster than comparing entities based on their respective topic models. Moreover, poor topic inference issues can more easily avoided due to the de-noising properties of RBMs. Additionally, this approach can also help prevent highly specific topics from being treated differently as they typically would be when only comparing entities based on their respective topics. For example, a page that posted about Android Jellybean and a page posting about Android Ice Cream Sandwich might be regarded as being different whereas the trained model can learn that these are part of a similar smartphone (or Android) pattern. In some embodiments, rather than using k-nearest neighbors or cosine similarity, a model can be trained to predict distances between latent representations for entities.

The filtering module 306 can refine the list of neighbor entities that are generated for any given entity. That is, the filtering module 306 can determine, based on one or more filtering criteria, whether a neighbor entity of a first entity should be recommended to users that have interacted, or formed a connection, with the first entity. In some embodiments, the filtering module 306 can be configured to apply a different set of filtering criteria based on an entity's categorization. In one example, a page may be classified as a large page (e.g., popular pages having at least a threshold number of connections or fans) or a small page (e.g., less popular pages having fewer than a threshold number of connections or fans). In this example, different filtering criteria may be applied to large pages than to small pages, depending on the implementation.

In some embodiments, the filtering module 306 filters entities based on their respective geographic centroids. In various embodiments, entities can be associated with one or more geographic centroids. A centroid for an entity can be computed based on a distribution of the respective locations of users that are connected with, or fans of, the entity. Based on the variance of the distribution, the entity may be classified in a local, regional, country, or global category.

The centroid(s) determined for the entity can be used to determine one or more radii that represent areas of influence for the entity. In one example, a geographic region corresponding to a p25 radius that extends from a centroid of a page includes 25 percent of the users that are associated with the page. In another example, a geographic region corresponding to a p50 radius that extends from a centroid of the page includes 50 percent of the users that are associated with the page. Further, a geographic region corresponding to a p75 radius that extends from a centroid of the page includes 75 percent of the users that are associated with the page. In some embodiments, to be recommended, a neighbor entity of a first entity must be associated with a geographic region that has a threshold amount of overlap with a geographic region associated with the first entity. In one example, the threshold overlap is satisfied when an area of influence (e.g., p50 radius, p75 radius, etc.) for the neighbor entity overlaps with a corresponding area of influence (e.g., of the same size) for the first entity. In some embodiments, for a neighbor entity to be recommended, the neighbor entity and a first entity must each be associated with a centroid of the same size or size having a threshold level of similarity.

In some embodiments, the filtering module 306 can be configured to filter entities based on the distances between their respective latent representations. For example, the distance can be determined by computing a cosine similarity between the latent representation of a neighbor entity and the latent representation of a first entity. In such embodiments, if the distance does not satisfy a threshold value, then the neighbor entity will not be provided as a recommendation, for example, to a user that interacted, or formed a connection, with the first entity. In some embodiments, the filtering module 306 determines not to use an entity in recommendations if the reconstruction score for the entity does not satisfy a threshold value. As mentioned, reconstruction involves running latent representations through the model in reverse to determine which of the original input nodes are activated. The reconstruction score for an entity measures the accuracy of the reconstruction with respect to the originally provided input (e.g., topic model) for the entity.

The filtering module 306 can also be configured to filter entities based on various attributes associated with the entities. In some embodiments, a neighbor entity of a first entity is not used as a recommendation if the number of topics associated with the neighbor entity does not satisfy a threshold value. This threshold can be learned, for example, based on the minimum number of topics needed to produce a reliable latent representation (e.g., a latent representation having at least a threshold reconstruction score) through the model. In some embodiments, the neighbor entity is not used as a recommendation if the difference between the number of fans associated with the neighbor entity and the number of fans associated with the first entity exceeds a threshold value. That is, for example, if the number of fans of the neighbor entity (e.g., a page for a high school) is substantially different than the number of fans of the first page (e.g., a page for a public figure), then the neighbor entity is not a good recommendation to fans of the first page and is, therefore, not provided as a recommendation to such users.

The filtering module 306 can filter neighbor entities based on their predicted conversion rates. In some embodiments, for each neighbor entity of a first entity, the filtering module 306 can determine a respective conversion rate that measures the rate at which users form a connection with the neighbor entity when the neighbor entity is presented as a suggestion. Neighbor entities that have a respective conversion rate that is greater than an average conversion rate of all recommended neighbor entities can be identified as quality recommendations and, therefore, can be provided as recommendations, for example, to users that interact, or form a connection, with the first entity.

In some embodiments, entities that are small pages are filtered based on a social similarity. For example, a neighbor entity of a first entity, both of which are small pages, can be recommended to users that interact, or form a connection, with the first entity when at least a threshold number of users have fanned both the first entity and the neighbor entity. Additionally, in some embodiments, the neighbor entity and the first entity must both be similarly sized (e.g., have a number of fans within a threshold level of similarity). In some embodiments, the filtering module 306 is configured to filter entities based on their sentiment. The sentiment of a given entity can be determined, for example, using generally known techniques. The respective sentiment determined for a neighbor entity and for a first entity can be used to help isolate differences in attitude or perspective, and also separate out entities which, for example, debate politics from those which post neutral news about elections.

The recommendation module 306 is configured to generate entity recommendations, or suggestions, to users. In various embodiments, the entity recommendations are generated from candidate entities that may or may not have been filtered by the filtering module 306. In one example, a user can be recommended entities based on the users' past interactions, or connections, with entities. The recommendation module 306 can rank and provide entity recommendations to a user based on their respective topic similarities. That is, for example, entities that share more topics can be ranked higher than entities that do not. In some embodiments, the recommendation module 306 can use features of the candidate entities to train a machine learning (ML) model for predicting a conversion rate of a user for a given candidate entity. That is, the recommendation module 306 can train the ML model to predict a likelihood that the user will interact, or form a connection, with the candidate entity. The recommendation module 306 can rank and provide entity recommendations to a user based on the respective conversion rate that is predicted for each entity.

Figure 4:
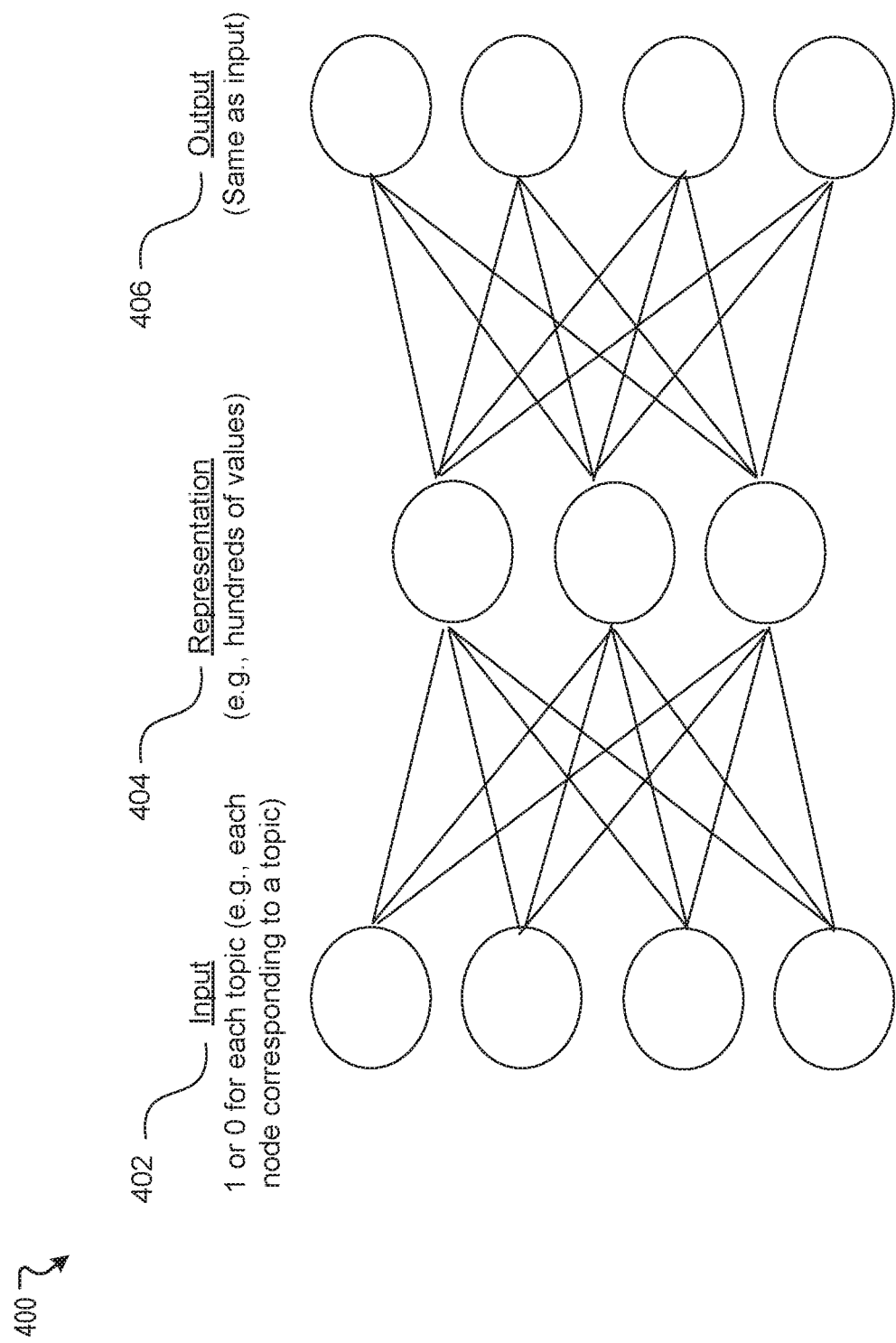
FIG. 4 illustrates an example diagram of a model for generating latent representations of entity topic models, according to an embodiment of the present disclosure.

FIG. 4 illustrates an example diagram of a model 400 for generating latent representations of entity topic models, according to an embodiment of the present disclosure. In various embodiments, the model 400 includes a set of visible input nodes 402 and each input node corresponds to a particular topic. In such embodiments, each input node is configured to receive either a 1 or 0 as input, which signifies whether the topic corresponding to the node was or was not identified, respectively, for a given entity. The model 400 also includes a set of hidden nodes 404 that are trained to generate the respective latent representations for entities. Further, the model 400 also includes a set of output nodes 406 that can be used to reconstruct inputs from their corresponding latent representations, for example, for purposes of evaluating the model 400.

Figure 5:
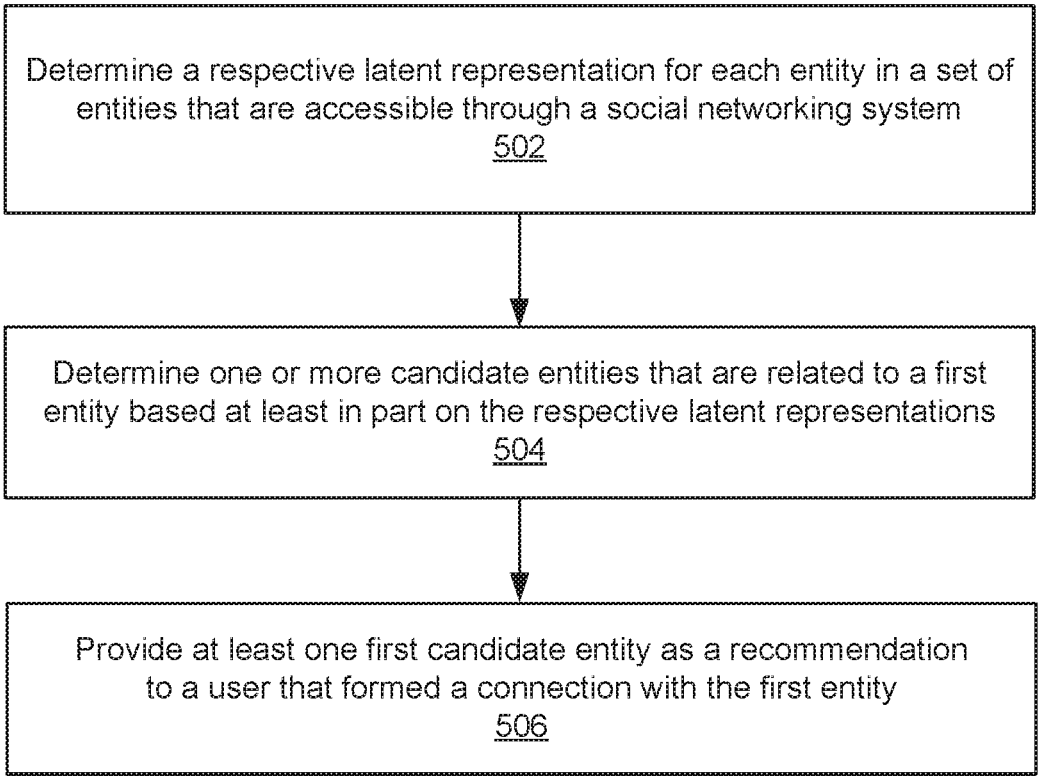
FIG. 5 illustrates an example process for generating entity recommendations, according to an embodiment of the present disclosure.

FIG. 5 illustrates an example process 500 for generating entity recommendations, according to an embodiment of the present disclosure. It should be appreciated that there can be additional, fewer, or alternative steps performed in similar or alternative orders, or in parallel, within the scope of the various embodiments discussed herein unless otherwise stated. At block 502, a respective latent representation is determined for each entity in a set of entities that are accessible through the social networking system. A latent representation for an entity is determined based at least in part on a topic model associated with the entity, each latent representation for an entity having a lower dimensionality than a topic model of the entity. At block 504, one or more candidate entities that are related to a first entity are determined based at least in part on the respective latent representations for the candidate entities and the first entity. At block 506, at least a first candidate entity from the one or more candidate entities is provided as a recommendation to a user that formed a connection with the first entity.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
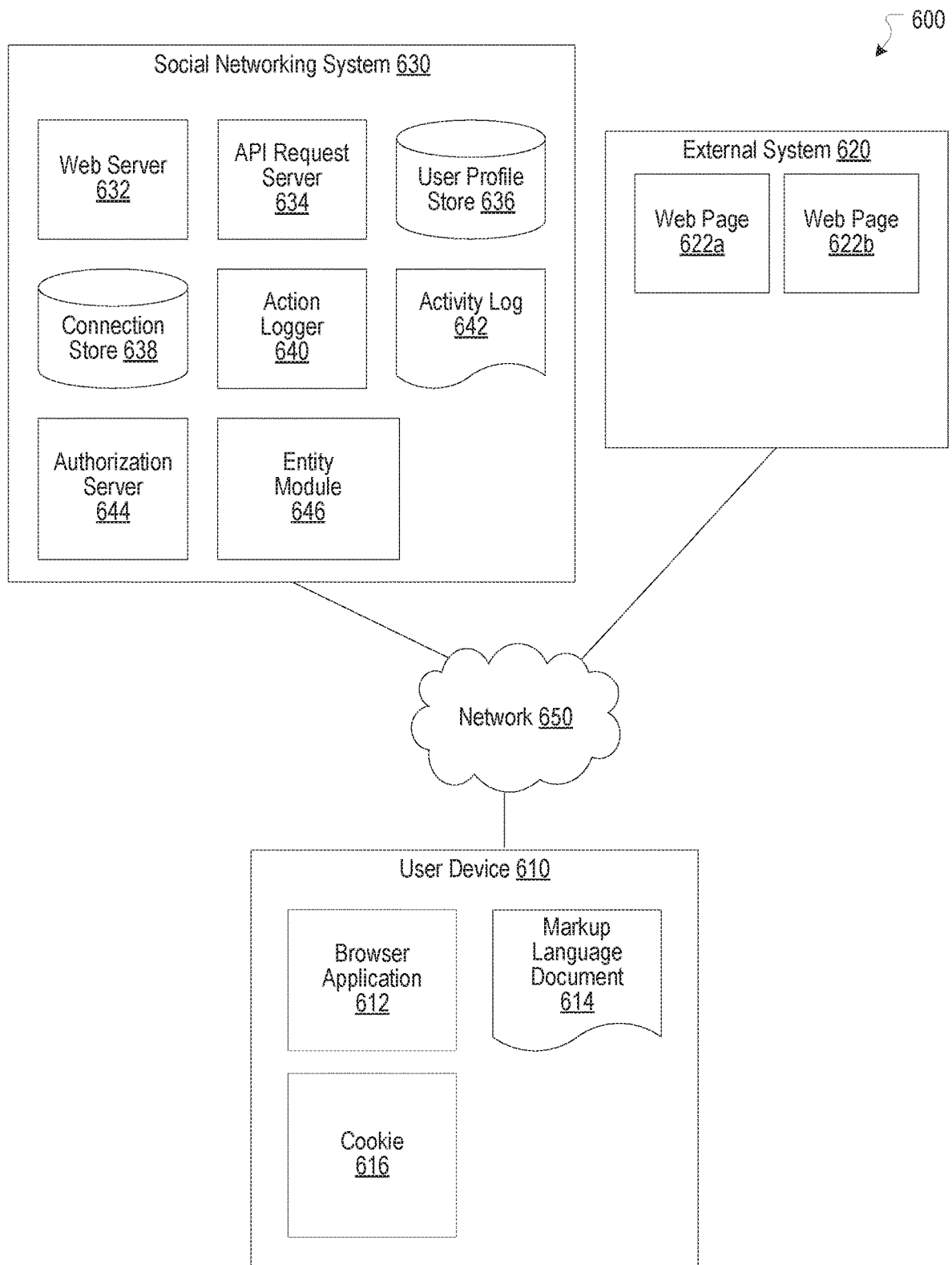
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, the Microsoft Windows ® operating system (OS), the Apple OS X ® operating system, and/or a Linux ® distribution. In another embodiment, the user device 610 can be a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID™. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an entity module 646. The entity module 646 can, for example, be implemented as the entity module 102 of FIG. 1. As discussed previously, it should be appreciated that there can be many variations or other possibilities.

Hardware Implementation

Figure 7:
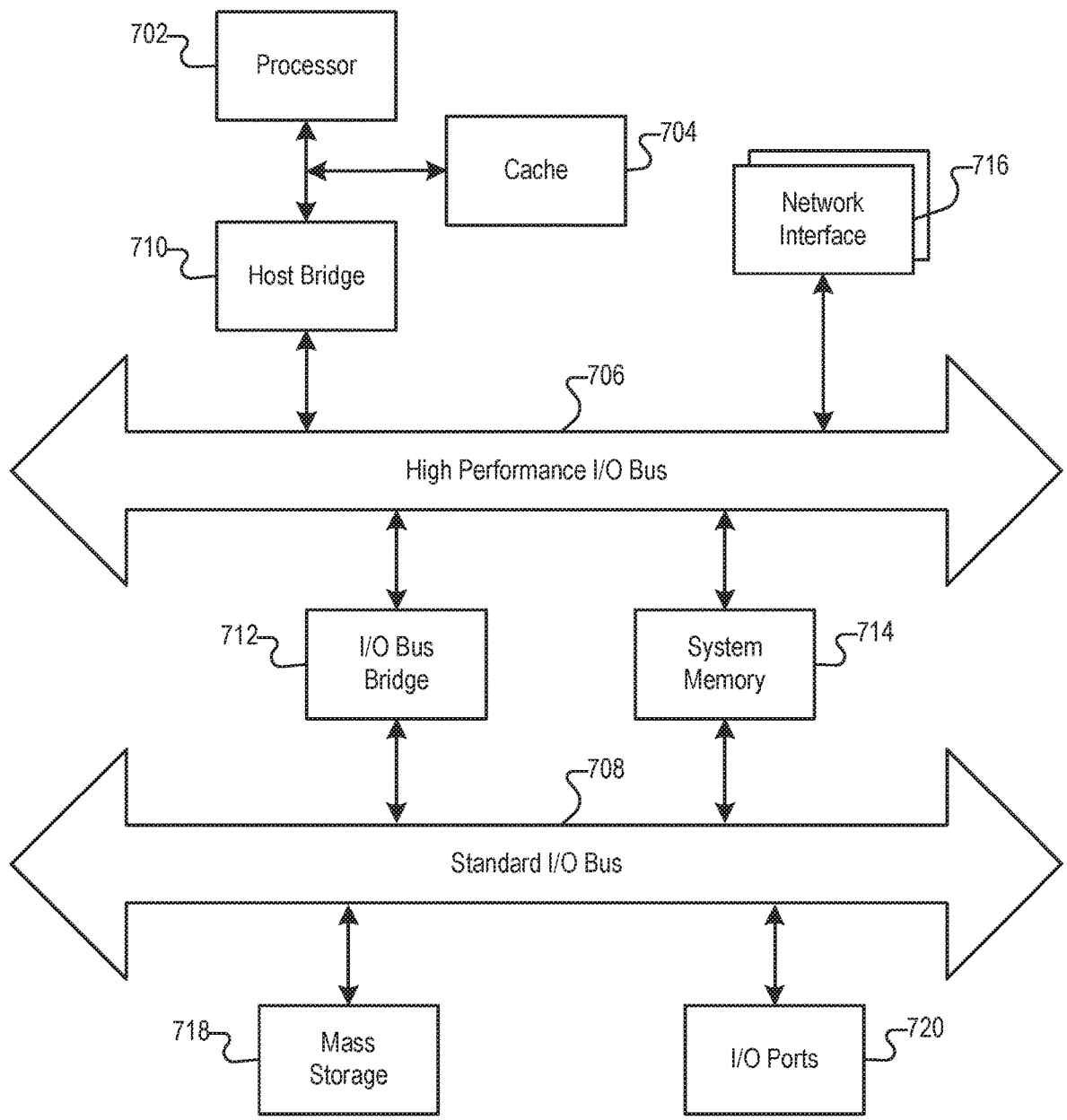
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
determining, by a social networking system, a respective latent representation for each entity in a set of entities that are accessible through the social networking system, wherein a latent representation for an entity is determined based at least in part on a topic model associated with the entity, wherein the topic model is represented as a data structure in which each element corresponds to a particular topic associated with an input node of at least one trainable model, each latent representation for an entity having a lower dimensionality than a topic model of the entity, wherein determining the respective latent representation for each entity in the set of entities further comprises:
 obtaining, by the social networking system, a respective topic model for each entity in the set of entities; and
 training, by the social networking system, the at least one trainable model using the respective topic model to output a respective latent representation that corresponds to the respective topic model,
 wherein training comprises providing the respective latent representation to the at least one trainable model to determine activation of input nodes, including the input node, of the at least one trainable model;
determining, by the social networking system, one or more candidate entities that are related to a first entity based at least in part on the respective latent representations for the candidate entities and the first entity; and
providing, by the social networking system, at least a first candidate entity from the one or more candidate entities as a recommendation to a user that formed a connection with the first entity.

2. The computer-implemented method of claim 1, wherein the at least one trainable model is implemented as a restricted Boltzmann machine.

3. The computer-implemented method of claim 1, wherein the trainable model includes at least a set of input nodes and a set of hidden nodes, each input node corresponding to a topic and being configured to receive a value indicating whether the topic was identified in an entity, and each hidden node being configured to output a value determined based at least in part on values provided to one or more of the input nodes.

4. The computer-implemented method of claim 1, wherein determining the one or more candidate entities that are related to the first entity further comprises:
 determining, by the social networking system, that a distance between a respective latent representation for a candidate entity of the one or more candidate entities and a latent representation for the first entity satisfies a threshold distance.

5. The computer-implemented method of claim 1, wherein providing at least the first candidate entity from the one or more candidate entities as a recommendation further comprises:
 determining, by the social networking system, that at least one geographic centroid associated with the first candidate entity has a threshold amount of overlap with at least one geographic centroid associated with the first entity.

6. The computer-implemented method of claim 1, wherein providing at least the first candidate entity from the one or more candidate entities as a recommendation further comprises:
 determining, by the social networking system, that a reconstruction score for the first candidate entity satisfies a threshold score, the reconstruction score being determined using the trainable model trained to output a latent representation for the first candidate entity, wherein the reconstruction score measures an accuracy of a reconstruction of a topic model of the first candidate entity through the trainable model using the latent representation.

7. The computer-implemented method of claim 1, wherein providing at least the first candidate entity from the one or more candidate entities as a recommendation further comprises:
 determining, by the social networking system, that a difference between a number of fans associated with the first candidate entity and a number of fans associated with the first entity satisfies a threshold value.

8. The computer-implemented method of claim 1, wherein providing at least the first candidate entity from the one or more candidate entities as a recommendation further comprises:
 determining, by the social networking system, that at least a threshold number of users have fanned both the first candidate and the first entity.

9. The computer-implemented method of claim 1, wherein an entity corresponds to at least a page, user profile, group, story, or status update that is accessible through the social networking system.

10. A system comprising:
at least one processor; and
a memory storing instructions that, when executed by the at least one processor, cause the system to perform:
 determining a respective latent representation for each entity in a set of entities that are accessible through a social networking system, wherein a latent representation for an entity is determined based at least in part on a topic model associated with the entity, wherein the topic model is represented as a data structure in which each element corresponds to a particular topic associated with an input node of at least one trainable model, each latent representation for an entity having a lower dimensionality than a topic model of the entity, wherein determining the respective latent representation for each entity in the set of entities further comprises:
  obtaining, by the social networking system, a respective topic model for each entity in the set of entities; and
  training, by the social networking system, the at least one trainable model using the respective topic model to output a respective latent representation that corresponds to the respective topic model, wherein training comprises providing the respective latent representation to the at least one trainable model to determine activation of input nodes, including the input node, of the at least one trainable model;

determining one or more candidate entities that are related to a first entity based at least in part on the respective latent representations for the candidate entities and the first entity; and providing at least a first candidate entity from the one or more candidate entities as a recommendation to a user that formed a connection with the first entity.

11. The system of claim 10, wherein the at least one trainable model is implemented as a restricted Boltzmann machine.

12. The system of claim 10, wherein the trainable model includes at least a set of input nodes and a set of hidden nodes, each input node corresponding to a topic and being configured to receive a value indicating whether the topic was identified in an entity, and each hidden node being configured to output a value determined based at least in part on values provided to one or more of the input nodes.

13. The system of claim 10, wherein determining the one or more candidate entities that are related to the first entity further causes the system to perform:

determining that a distance between a respective latent representation for a candidate entity of the one or more candidate entities and a latent representation for the first entity satisfies a threshold distance.

14. A non-transitory computer-readable storage medium including instructions that, when executed by at least one processor of a computing system, cause the computing system to perform a method comprising:

determining a respective latent representation for each entity in a set of entities that are accessible through a social networking system, wherein a latent representation for an entity is determined based at least in part on a topic model associated with the entity, wherein the topic model is represented as a data structure in which each element corresponds to a particular topic associated with an input node of at least one trainable model, each latent representation for an entity having a lower dimensionality than a topic model of the entity, wherein determining the respective latent representation for each entity in the set of entities further comprises:

obtaining, by the social networking system, a respective topic model for each entity in the set of entities; and training, by the social networking system, the at least one trainable model using the respective topic model to output a respective latent representation that corresponds to the respective topic model, wherein training comprises providing the respective latent representation to the at least one trainable model to determine activation of input nodes, including the input node, of the at least one trainable model;

determining one or more candidate entities that are related to a first entity based at least in part on the respective latent representations for the candidate entities and the first entity; and providing at least a first candidate entity from the one or more candidate entities as a recommendation to a user that formed a connection with the first entity.

15. The non-transitory computer-readable storage medium of claim 14, wherein the at least one trainable model is implemented as a restricted Boltzmann machine.

16. The non-transitory computer-readable storage medium of claim 14, wherein the trainable model includes at least a set of input nodes and a set of hidden nodes, each input node corresponding to a topic and being configured to receive a value indicating whether the topic was identified in an entity, and each hidden node being configured to output a value determined based at least in part on values provided to one or more of the input nodes.

17. The non-transitory computer-readable storage medium of claim 14, wherein determining the one or more candidate entities that are related to the first entity further causes the computing system to perform:

determining that a distance between a respective latent representation for a candidate entity of the one or more candidate entities and a latent representation for the first entity satisfies a threshold distance.

* * * * *